US009765950B2

(12) United States Patent
Corrigan et al.

(10) Patent No.: US 9,765,950 B2
(45) Date of Patent: Sep. 19, 2017

(54) FLUORESCENT FIBER LIGHT SENSOR

(71) Applicant: 3M INNOVATIVE PROPERTIES COMPANY, St. Paul, MN (US)

(72) Inventors: Thomas R. Corrigan, St. Paul, MN (US); Patrick R. Fleming, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 389 days.

(21) Appl. No.: 14/391,115

(22) PCT Filed: Apr. 5, 2013

(86) PCT No.: PCT/US2013/035354
§ 371 (c)(1),
(2) Date: Oct. 7, 2014

(87) PCT Pub. No.: WO2013/154917
PCT Pub. Date: Oct. 17, 2013

(65) Prior Publication Data
US 2015/0138823 A1    May 21, 2015

Related U.S. Application Data

(60) Provisional application No. 61/623,225, filed on Apr. 12, 2012.

(51) Int. Cl.
*F21V 14/00* (2006.01)
*G01J 1/42* (2006.01)
(Continued)

(52) U.S. Cl.
CPC ........... *F21V 14/006* (2013.01); *G01D 5/268* (2013.01); *G01J 1/4204* (2013.01);
(Continued)

(58) Field of Classification Search
CPC ........................... F21V 14/006; G02B 6/0008
See application file for complete search history.

(56) References Cited

U.S. PATENT DOCUMENTS 3,553,466 A   1/1971   Johnston
4,650,992 A   3/1987   Ruhrmann
(Continued)

FOREIGN PATENT DOCUMENTS

EP   0531159   3/1993
EP   2028410   2/2009
(Continued)

OTHER PUBLICATIONS

"Plastic Scintillating Fibers", Scintillation Products, Saint-Gobain Crystals, pp. 1-6.
(Continued)

*Primary Examiner* — Elmito Breval
(74) *Attorney, Agent, or Firm* — Jeffrey M. Olofson (57) ABSTRACT

Generally, the present disclosure provides for a light duct sensor that can monitor an average light flux through light duct useful for architectural lighting. The present disclosure provides for a system that allows a minimally obtrusive sampling of the light in a duct. It samples a small fraction of a cross sectional area of a light duct that is distributed across potentially the entire cross sectional area, without creating a significant disturbance to the light.

20 Claims, 3 Drawing Sheets

(51) Int. Cl.
*F21V 8/00* (2006.01)
*G01D 5/26* (2006.01)

(52) U.S. Cl.
CPC ......... *G02B 6/0003* (2013.01); *G02B 6/0006* (2013.01); *G02B 6/0008* (2013.01)

(56) References Cited

U.S. PATENT DOCUMENTS

| | | | |
|---|---|---|---|
| 4,733,929 A | 3/1988 | Brown | |
| 2004/0160606 A1* | 8/2004 | Lakowicz | ............ G01N 21/648 356/445 |
| 2009/0289190 A1 | 11/2009 | Laine | |
| 2010/0061088 A1 | 3/2010 | Bartol | |
| 2011/0198505 A1 | 8/2011 | Ishida | |
| 2011/0291014 A1 | 12/2011 | Kusner | |

FOREIGN PATENT DOCUMENTS

| | | |
|---|---|---|
| JP | 58075082 | 5/1983 |
| WO | WO 89-08224 | 9/1989 |

OTHER PUBLICATIONS

International Search Report for PCT Application No. PCT/US2013/035354, mailed on Aug. 21, 2013, 3 pages.

\* cited by examiner

FLUORESCENT FIBER LIGHT SENSOR

CROSS REFERENCE TO RELATED APPLICATIONS

This application is a national stage filing under 35 U.S.C. 371 of PCT/US2013/035354, filed Apr. 5, 2013, which claims priority to U.S. Provisional Application No. 61/623,225, filed Apr. 12, 2012, the disclosure of which is incorporated by reference in its/their entirety herein.

BACKGROUND

The long-distance transport of visible light can use large mirror-lined ducts, or smaller solid fibers which exploit total internal reflection. Mirror-lined ducts include advantages of large cross-sectional area and large numerical aperture (enabling larger fluxes with less concentration), a robust and clear propagation medium (that is, air) that leads to both lower attenuation and longer lifetimes, and a potentially lower weight per unit of light flux transported. Solid fibers include the advantage of configuration flexibility, which can result in relatively tight bends with low light loss. While the advantages of mirror-lined ducts may appear overwhelming, fibers are nevertheless frequently selected because of the practical value of assembling light conduits in much the same fashion as plumbing. Efficient low-loss light-ducting systems fabricated in a fashion similar to plumbing, or heating, ventilating and air-conditioning (HVAC) ductwork is desired.

SUMMARY

Generally, the present disclosure provides for a light duct sensor that can monitor an average light flux through light duct useful for architectural lighting. The present disclosure provides for a system that allows a minimally obtrusive sampling of the light in a duct. It samples a small fraction of a cross sectional area of a light duct that is distributed across potentially the entire cross sectional area, without creating a significant disturbance to the light. In one aspect, the present disclosure provides a light duct sensor that includes a light detecting region; an optical fiber disposed within the detecting region capable of intercepting light incident on a longitudinal surface of the optical fiber and guiding the intercepted light within the optical fiber; and a sensor disposed to accept an emitted light from at least one of a first end and a second end of the optical fiber, the sensor capable of detecting the emitted light intensity.

In another aspect, the present disclosure provides a light duct sensor that includes a hollow light duct section having a cross-sectional area; an optical fiber traversing the cross-sectional area to intercept light incident on a longitudinal surface of the optical fiber; a fluorescent material disposed in the optical fiber to convert a portion of the incident light; and a sensor disposed to accept an emitted light from at least one of a first end or a second end of the optical fiber, the sensor capable of detecting an intensity of the emitted light.

In yet another aspect, the present disclosure provides a method for controlling a light distribution system that includes disposing a light duct sensor within a hollow light duct; monitoring an average light flux within the hollow light duct using the light duct sensor; detecting a change in the average light flux; and controlling at least one of a solar collector positioning device, an auxiliary light injector, a diverter baffle, an extractor baffle, or a combination thereof, to control the average light flux.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Generally, the present disclosure provides for a light duct sensor that can monitor an average light flux through light duct useful for architectural lighting. In some cases, architectural lighting can use solar collectors and concentrators to provide light to the interior of architectural buildings. Often, a slight misalignment of the solar collecting apparatus can result in a drastically reduced light flux through the light duct, and appropriate adjustment of the positioning of the solar collector becomes necessary. In order to provide for a more uniform, uninterrupted light flux within the building, a reliable technique to measure the average light flux within the duct can be desired. Further, as light is extracted or re-directed for point-of-use throughout the building, adjustment or addition of any injected "back-up" light such as from an artificial source can be used to provide adequate as well as uniform lighting. Measurement of the existing light flux within the duct can be instrumental for determining the required intensity of injected light.

There does not currently exist an inexpensive, reliable technique to sample the actual amount of light (for example, from a solar source or otherwise) that is passing through a reflective light transmission duct. While several techniques are available for the measurement of light flux on a point-to-point basis across an area, a low-cost, reliable technique for measuring the average flux is still needed. The nature of ducted illumination, and in particular solar supplied illumination, is that the spatial distribution of light across the duct may vary with time. The angular distribution of the light can also varies over time.

One technique for measuring light is a point source detector. Such sensors could be mounted on the surface of the duct. In the case of ducting having Enhanced Specular Reflective (Vicuiti™ ESR film, available from 3M Company) film, such sensors could theoretically be mounted behind the ESR to measure the small amount of light that passes through the film. However, a large number of point source detectors would be required for reliable monitoring of the light, and a large amount of averaging would be required to account for the substantial local variations in light over the course of the day. Regardless of these limitations, much of the light could still not be detected by such systems because it will be tightly collimated and will not make contact with a reflective surface until it has traveled a great distance, increasing the size of a surface mount system.

The present disclosure provides for a system that allows a minimally obtrusive sampling of the light in a duct. It samples a small fraction of a cross sectional area of a light duct that is distributed across potentially the entire cross sectional area, without creating a significant disturbance to the light.

A device for measuring the average amount of light in a reflective duct is presented in the disclosure that follows. In one particular embodiment, a fiber optic cable can be disposed within a light detecting region of a light duct by one of several techniques, ranging from simply hanging the fiber optic in the duct, or by more sophisticated averaging techniques such as by weaving across a light duct, to sample the light flux across a section of the duct. Some technique is generally provided to ensure that light within the duct that intercepts the optical fiber, can be conveyed within the optical fiber to be detected by a sensor that can be located either external to the duct or within the duct. The particular technique used can range from dispersing fluorescent particles that can be designed to fluoresce in the presents of daylight within the fiber such that a portion of the fluoresced light is guided within the fiber, to the technique of incorporation of scattering centers within the fiber to re-direct the propagation direction of the light incident to the fiber, to the technique of providing structures on or in the fiber that can re-direct the light to follow the optical fiber, or a combination thereof.

An optical sensor can then be attached to at least one end of the fiber to measure the amount of light generated and/or guided within the fiber. The optical sensor generally can emit or modulate an electrical signal that can be used in a control circuit, and can be selected from a photodiode, a photo resistor, a photo transistor, and the like. It is to be understood that any suitable optical sensor can be used, including those that can detect light by a change in other chemical or physical processes including, for example, dyes such as photographic dyes, phosphors, calorimeters, photo-curing systems, and other photoreacting systems such as chlorophyll or vitamin A. In one particular embodiment described herein, the optical sensor can be a fiber optic photodiode, although other sensors could be used. The output of the photodiode sensor can be proportional to an average amount of daylight or other light flux within the duct, and can be used to provide a control signal to effect repositioning of a solar collector; repositioning of a baffle or other device used to re-direct light for light extraction or light diversion; modifying the reflective, scattering, or extraction properties of a surface; or provide a control signal to an auxiliary lighting source, as described elsewhere.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

In one particular embodiment, the light duct sensor system can be used as part of a feedback system for accurately aligning a solar collector with the sun. Since the output of the sensor can be representative of the actual light being collected, the sensor and any associated control circuitry can capture and adjust for physical variations that might affect the performance of the collector, and still achieve a desired output.

In one particular embodiment, the light duct sensor system can also be used in conjunction with a supplementary artificial source that feeds a full architectural lighting system. The light duct sensor system can communicate with a controller to represent how much light is actually being collected. This communication can allow an artificial source to compensate for changes due to cloud cover, haze, sunset, extraction, mis-alignment, and the like.

The fluorescent-doped optical fibers can be commercially available scintillating fiber optics that are frequently used for decorative purposes, since they can absorb ambient light and re-emit in a different wavelength (color) to create an interesting optical effect. They are also typically used in light amplification devices such as archery sights, in several medical applications, and in general materials research to detect high energy particles. The optical fibers can have a core which is fabricated from either inorganic (such as glasses) materials, or organic (such as polymers) materials, and may also have one or more included cladding layers (typically polymeric) that can protect the fiber and promote total internal reflection (TIR) from the interior surfaces, as known to one of skill in the art. Commercially available examples of such scintillating optical fibers are available from Saint-Gobain Crystals, Hiram Ohio and also from Industrial Fiber Optics Inc., Tempe Ariz.

Commercially available fiber optic cable contains additives which absorb light in the solar spectrum and emit light in a spectrum that is easily detectable. When light (such as from the sun) passes through the fiber and contacts a particle (or dopant, or region), that particle can absorb the light and re-emit light at another frequency. Because the light was emitted inside the fiber optic, a portion of the light will travel (that is, be guided) within the fiber and be trapped there by total internal reflection. The generated light typically will have very low losses from the cable, so the cable functions as an effective accumulator of the generated light, even over a long length of cable. If a sensor, such as a photodiode is placed at one end of the fiber it will detect the emitted light which will be proportional to the average amount of input light passing through the duct.

The other end of the fiber can be covered to prevent stray light entry, or it can be polished and coated to create a mirror surface that will redirect light back down the cable toward the sensor. The reflected light can partially compensate for the fiber losses and help balance the signal over the length of the cable. It will be balanced because at each point of emission half the light will travel directly to the sensor and half will travel to the mirror end then back to the sensor. Each point source of light will have an equal contribution to the sensor output, regardless for its position along the length of the fiber. A length of the fiber optic cable can be suspended in the duct or even woven through a cross section of a duct section as described elsewhere:

Multiple fibers could also be used in conjunction with the sensor, and any desired weaving patterns could also be used to increase or decrease the amount or positioning of light sampling. The turns in the fiber in a woven pattern could be supported by a structure to protect the fibers. The same structure could also support the sensor (photodiode). This would create a robust duct section that comprises an averaging light sensor. The regions of fiber outside of the duct could be covered, painted, coated, or otherwise shielded to prevent any exterior or stray light from generating a signal to the sensor.

Some of the advantages of the present light duct sensor over other point-source designs include: single sensor used, simple to design and use, inexpensive components, capability of averaging over a large area, and not sensitive to angular variations in the light. In one particular embodiment, for example, a 0.5 mm diameter fiber optic cable can be woven 14 times across a 6"×6" (15.2 cm×15.2 cm) duct section. The total area being sample is calculated to be about 1.65 in$^2$ (10.65 cm$^2$). The total area of the duct is 36 in$^2$ (232 cm$^2$), so the maximum percent of light loss from the sensor is about 4.5% for this geometry. The actual light loss is expected to be significantly less, since not all the light will be absorbed in the cable.

Figure 1A:
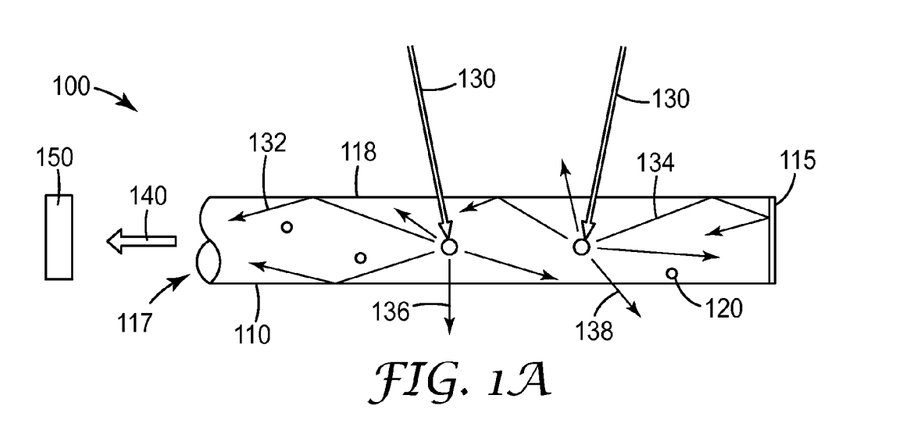
FIG. 1A shows a schematic cross-sectional view of an optical fiber.

FIG. 1A shows a schematic cross-sectional view of an optical fiber sensor 100 disposed in a light detecting region, according to one aspect of the disclosure. Optical fiber sensor 100 includes an optical fiber 110 and a sensor 150 disposed to accept an emitted light 140 guided from a first end 117 of the optical fiber 110. Optical fiber 110 includes particles 120 dispersed throughout, an optional mirrored end 115, and a longitudinal surface 118. Incident light 130 enters the optical fiber 110 along the longitudinal surface 118 and intercepts particle 120 where it is either scattered (scattering particle) or re-emitted at the same or different wavelength (fluorescent particle) as emitted light rays.

Emitted light rays are guided down the optical fiber 110 to emerge from first end 117 as emitted light 140. A representative first light ray 132 travels down the optical fiber 110 toward the sensor 150, and reflects from the longitudinal surface 118 by TIR. A representative second light ray 134 travels down the optical fiber 110 in a direction opposite the sensor 150, undergoes TIR from the longitudinal surface 118 and reflects from optional mirrored end 115 back toward the sensor 150. In some cases, the optional mirrored end 115 can be instead coated with a material that does not reflect light, and light rays traveling opposite the sensor 150 do not contribute to the emitted light 140. A representative third light ray 136 travels in a direction nearly normal to the longitudinal surface 118, and is lost from the optical fiber 110. A representative fourth light ray 138 intersects the longitudinal surface 118 at an angle greater than the critical angle for the interface between the optical fiber 110 and the surrounding medium (that is, air) and is also lost from the optical fiber 110.

Figure 1B:
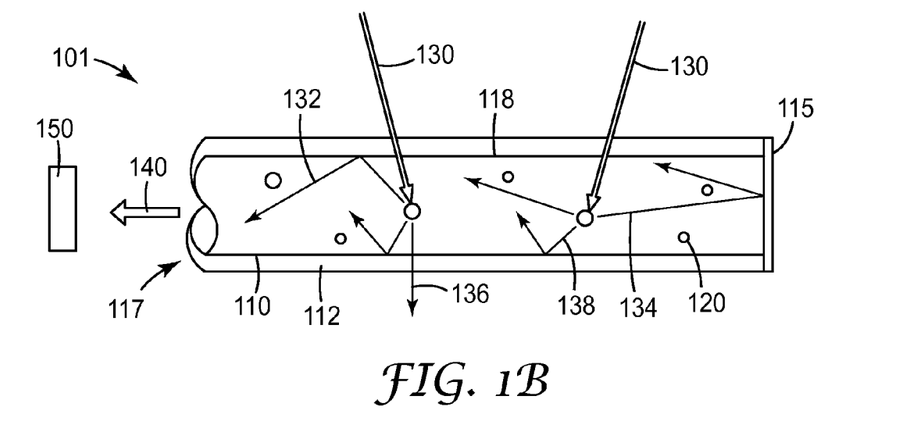
FIG. 1B shows a schematic cross-sectional view of an optical fiber.

FIG. 1B shows a schematic cross-sectional view of an optical fiber sensor 101 disposed in a light detecting region, according to one aspect of the disclosure. Optical fiber sensor 101 includes an optical fiber 110 and a sensor 150 disposed to accept an emitted light 140 guided from a first end 117 of the optical fiber 110. Optical fiber 110 includes particles 120 dispersed throughout, a cladding layer 112, an optional mirrored end 115, and a longitudinal surface 118. Cladding layer 112 has an index of refraction value between the surrounding medium (air) and the material of optical fiber 110, so that TIR can more efficiently occur especially in the case of another material contacting the optical fiber 110, as known to one of skill in the art. Incident light 130 enters the optical fiber 110 along the longitudinal surface 118 and intercepts particle 120 where it is either scattered (scattering particle) or re-emitted at the same or different wavelength (fluorescent particle) as emitted light rays.

Emitted light rays are guided down the optical fiber 110 to emerge from first end 117 as emitted light 140. A representative first light ray 132 travels down the optical fiber 110 toward the sensor 150, and reflects from the longitudinal surface 118 by TIR. A representative second light ray 134 travels down the optical fiber 110 in a direction opposite the sensor 150, undergoes TIR from the longitudinal surface 118 and reflects from optional mirrored end 115 back toward the sensor 150. In some cases, the optional mirrored end 115 can be instead coated with a material that does not reflect light, and light rays traveling opposite the sensor 150 do not contribute to the emitted light 140. A representative third light ray 136 travels in a direction nearly normal to the longitudinal surface 118, and is lost from the optical fiber 110. A representative fourth light ray 138 intersects the longitudinal surface 118 at an angle within the critical angle for the interface between the optical fiber 110 and the cladding 112, and therefore undergoes TIR. Without the additional cladding layer 112, the representative fourth light ray 138 would have left the optical fiber 110 as described in FIG. 1A, for a surrounding medium of air.

Figure 1C:
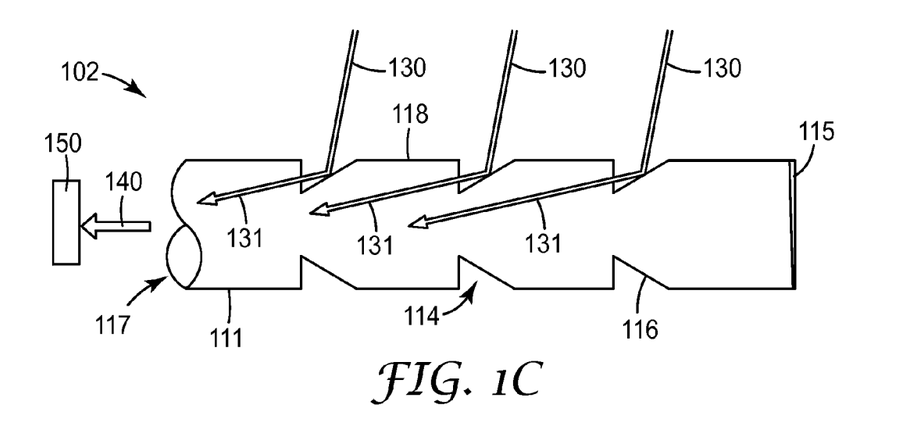
FIG. 1C shows a schematic cross-sectional view of an optical fiber.

FIG. 1C shows a schematic cross-sectional view of an optical fiber sensor 102 disposed in a light detecting region, according to one aspect of the disclosure. Optical fiber sensor 102 includes a structured optical fiber 111 and a sensor 150 disposed to accept an emitted light 140 guided from a first end 117 of the structured optical fiber 111. Structured optical fiber 111 includes a plurality of surface structures 114 that can re-direct a portion of an incident light 130 that intercepts a longitudinal surface 118, such that the re-directed light 131 is guided toward the first end 117.

Structured optical fiber 111 further includes an optional mirrored end 115. In one particular embodiment, incident light 130 enters the structured optical fiber 110 by interaction with the surface structures 114 along the longitudinal surface 118, reflects from re-directing surface 116, and are guided down the structured optical fiber 111 to emerge from first end 117 as emitted light 140. Surface structures 114 can be disposed along the longitudinal surface 118 in a random pattern or a regular pattern, and may be individual discrete structures or may extend around a circumference of the structured optical fiber 111 as desired.

Figure 2:
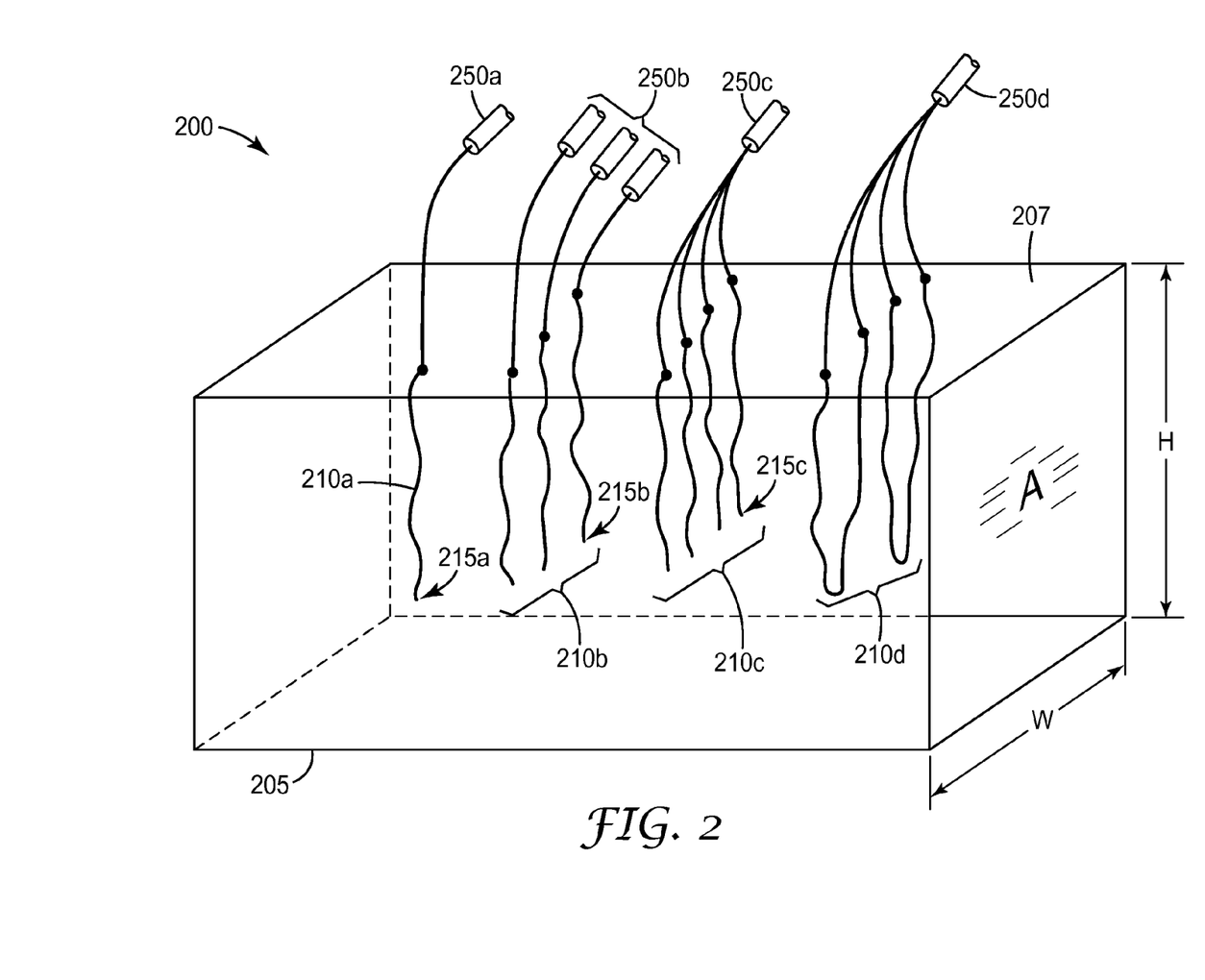
FIG. 2 shows a schematic perspective view of a light duct with light sensors.

FIG. 2 shows a schematic perspective view of a light duct sensing region 200 with several configurations of light duct sensors, according to one aspect of the disclosure. Light duct sensing region 200 includes a light duct 205 having a height "H", a width "W", and a cross-sectional area "A". In FIG. 2, four different representative configurations of light duct sensors are shown to include optical fibers 210a-d that can be loosely hanging or suspended from a top surface 207 of light duct 205. It is to be understood that in some cases, the optical fibers 210a-d can instead be strung horizontally, vertically, or at any desired angle within the light duct 205, and held in tension within the duct, as shown elsewhere. In one particular embodiment, first sensor 250a is disposed to accept an emitted light from a single first optical fiber 210a disposed hanging from top surface 207 of light duct 205, within cross-sectional area "A". The average light flux within the duct measured using this embodiment includes a height "H" average of the light flux, along a single width "W" position. Single first optical fiber 210a can have a first reflective end 215a and can be located anywhere across the width "W" of light duct 205. If desired, a mechanism for providing motion to single first optical fiber 210a can be included (not shown) such that when activated the single first optical fiber 210a can be "swept" across a portion of the cross-sectional area "A", providing another averaging scheme to the first sensor 250a.

In one particular embodiment, second plurality of sensors 250b is disposed to accept an emitted light from a plurality of second optical fibers 210b disposed hanging from top surface 207 of light duct 205, within cross-sectional area "A". The average light flux within the duct measured using this embodiment includes a height "H" average of the light flux, along a plurality of width "W" positions. Plurality of second optical fibers 210b can have a second reflective end 215b and can be located anywhere across the width "W" of light duct 205. If desired, a mechanism for providing motion to the plurality of second optical fibers 210b can be included (not shown) such that when activated the plurality of second optical fibers 210b can be "swept" across a portion of the cross-sectional area "A", providing another averaging scheme to the second plurality of sensors 250b.

In one particular embodiment, third sensor 250c is disposed to accept an emitted light from a plurality of third optical fibers 210c disposed hanging from top surface 207 of light duct 205, within cross-sectional area "A". The average light flux within the duct measured using this embodiment includes a height "H" and width "W" average of the light flux. The plurality of third optical fibers 210c can each have a third reflective end 215c and can be located anywhere across the width "W" of light duct 205. If desired, a mechanism for providing motion to the plurality of third optical fibers 210c can be included (not shown) such that when activated the plurality of third optical fibers 210c can be "swept" across a portion of the cross-sectional area "A", providing another averaging scheme to the third sensor 250c.

In one particular embodiment, fourth sensor 250d is disposed to accept an emitted light from a plurality of fourth optical fibers 210d disposed hanging from top surface 207 of light duct 205, within cross-sectional area "A". Each of the plurality of fourth optical fibers 210d includes both ends disposed to inject emitted light into fourth sensor 250d. The average light flux within the duct measured using this embodiment includes a height "H" and width "W" average of the light flux. The plurality of fourth optical fibers 210d can be located anywhere across the width "W" of light duct 205. It is to be understood that single fourth sensor 250d can instead be substituted with individual fourth sensors (not shown) so that each individual fiber or fiber end provides a different emitted light signal to a sensor. If desired, a mechanism for providing motion to the plurality of third optical fibers 210c can be included (not shown) such that when activated the plurality of third optical fibers 210c can be "swept" across a portion of the cross-sectional area "A", providing another averaging scheme to the fourth sensor 250d.

Figure 3:
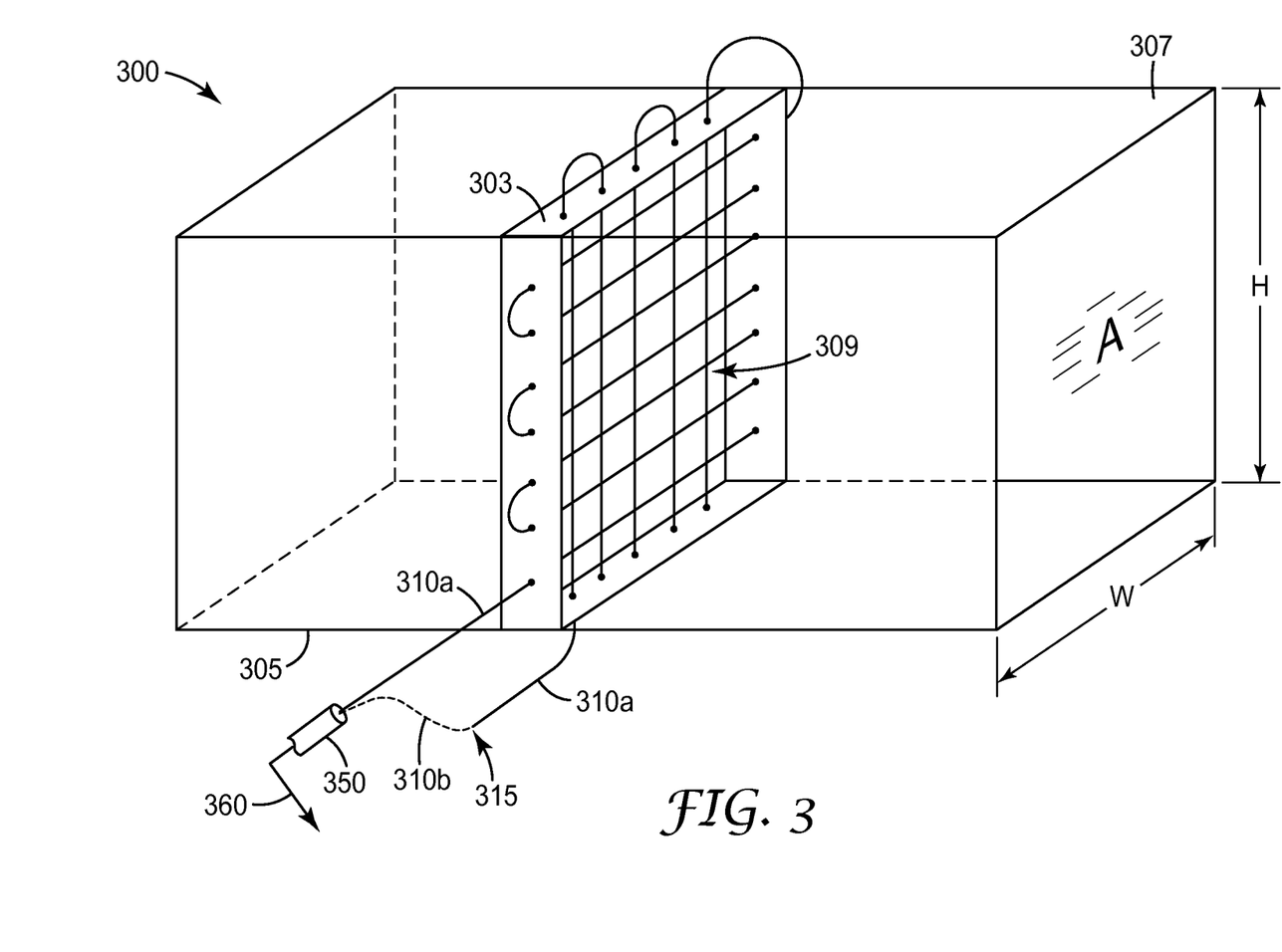
FIG. 3 shows a schematic perspective view of a light duct with light sensors.

FIG. 3 shows a schematic perspective view of a light duct sensing region 300, according to one aspect of the disclosure. Light duct sensing region 300 includes a light duct 305 having a height "H", a width "W", and a cross-sectional area "A". In FIG. 3, a light detecting region 309 is disposed within the light duct 305. Light detecting region 309 includes a hollow light duct section 303 through which an optical fiber 310a is woven to traverse the height "H" and width "W" of the light duct 305, and hold each the optical fiber 310a in tension within the duct. In some cases, hollow light duct section 303 can be an integral part of light duct 305, or it can be a separate article which can be removed and repositioned elsewhere, if desired. Optical fiber 310a can be woven in a rectangular pattern as shown, or a linear pattern either vertical or horizontal in the duct, or a triangular pattern, or a pentagonal pattern, or a hexagonal pattern, or any random pattern as desired. The optical fiber 310a can traverse the height and width of the light duct 305 as many times as desired, and can even extend to different positions along the length of the light duct 305 (not shown).

In one particular embodiment, sensor 350 is disposed to accept an emitted light from a first end of optical fiber 310a, and second end 315 can include a reflector, as described elsewhere. In some cases, the second end 315 can instead extend as fiber 310b to also direct emitted light into sensor 350. The average light flux within the duct measured using this embodiment includes a height "H" and a width "W" average of the light flux through light duct 305, and results in a signal 360 that can be used to control any of the devices described elsewhere.

EXAMPLES

Example 1

Indirect Sunlight Measurement Through a South Facing Window

One end of a fluorescing fiber (81 0065, from Industrial Fiber Optics, Tempe Ariz.) having a polystyrene core, acrylic cladding, numerical aperture of 0.58, 0.5 mm diameter, color=red) was inserted into a diode photodetector (AF D91, from Industrial Fiber Optics). The fiber was suspended on the inside of a south facing window. A multimeter set to current measurement was connected to the leads from the detector. Measurements were taken in early March 2012, in St. Paul, Minn., with an outside full sun reading of 100 μA, and are shown in Table 1.

TABLE 1

| Time | Current, μA |
|---|---|
| 7am | 0.5 |
| 10am | 30 |
| 12pm | 50 |
| 2pm | 30 |
| 4pm | 20 |

Example 2

Measurement of Artificial Light within a Duct

One end of a fluorescing fiber (81 0065, from Industrial Fiber Optics, having a polystyrene core, acrylic cladding, numerical aperture of 0.58, 0.5 mm diameter, color=red) was inserted into a diode photodetector (AF D91, from Industrial Fiber Optics). The 60 inch (152 cm) long fiber was woven back and forth making 4 passes at a 1.15 inch (2.92 cm) pitch in two orthogonal directions across a 6 inch (15.2 cm) diameter round metal duct. The leads of the photodetector were attached to the inputs of a current isolator (SEM1610, from Status Instruments, Scotch Plains, N.J.). The maximum input range of the current isolator was set to 0.1 mA, and the output of the isolator was set to produce 4-20 mA signals. The output of the current isolator was connected to a custom industrial controller, set to read 4-20 mA input as a percentage of full scale. The metal duct with the fiber was placed in front of an LG plasma light (PSH0731B, from PlasmaBright, Santa Fe Springs, Calif.). An ocean optics sensor (HR4000 High-resolution User-configured Spectrometer, Ocean Optics, Dunedin Fla.) was used to make measurements of the light flux in the plane of the fiber sensor, and that measurement was scaled by the cross sectional area of the duct to estimate the illuminance (lumens) in the duct. The corresponding measurement from the industrial controller was shown to correlate with the direct illuminance measurement. Two neutral density filters were used to reduce the amount of light reaching the sensors. The results are summarized below in Table 2.

TABLE 2

| Controller Reading | Direct illuminance measurement |
|---|---|
| 60.30% | 8,371 lumens |
| 35.90% | 4,560 lumens |
| 22.80% | 2,371 lumens |
| 15.80% | 1,167 lumens |
| 7.80% | 36 lumens |

Following are a list of embodiments of the present disclosure.

Item 1 is a light duct sensor, comprising: a light detecting region; an optical fiber disposed within the detecting region capable of intercepting light incident on a longitudinal surface of the optical fiber and guiding the intercepted light within the optical fiber; and a sensor disposed to accept an emitted light from at least one of a first end and a second end of the optical fiber, the sensor capable of detecting the emitted light intensity.

Item 2 is the light duct sensor of item 1, wherein the optical fiber is disposed to traverse at least one of a width and a height of a hollow light duct.

Item 3 is the light duct sensor of item 1 or item 2, wherein the optical fiber is disposed to traverse a width and a height of a hollow light duct.

Item 4 is the light duct sensor of item 1 to item 3, wherein the light detecting region comprises a cross-sectional area of a hollow light duct.

Item 5 is the light duct sensor of item 4, wherein the optical fiber is disposed to traverse the cross-sectional area in a mesh pattern.

Item 6 is the light duct sensor of item 5, wherein the mesh pattern comprises a triangular mesh, a rectangular mesh, a pentagonal mesh, a hexagonal mesh, or a random mesh.

Item 7 is the light duct sensor of item 1 to item 6, wherein the optical fiber comprises an inner core and an outer cladding, the inner core having a higher refractive index than the outer cladding.

Item 8 is the light duct sensor of item 1 to item 7, further comprising a fluorescent material dispersed in the optical fiber.

Item 9 is the light duct sensor of item 1 to item 8, wherein the fluorescent material is capable of converting a first wavelength of light to a second wavelength of light.

Item 10 is the light duct sensor of item 1 to item 9, further comprising a scattering material dispersed in the optical fiber.

Item 11 is the light duct sensor of item 1 to item 10, further comprising surface re-directing features on the optical fiber.

Item 12 is the light duct sensor of item 1 to item 11, wherein the light intensity can be correlated to an average light flux within a hollow light duct.

Item 13 is the light duct sensor of item 1 to item 12, wherein one of the first end and the second end of the optical fiber comprise a reflector.

Item 14 is the light duct sensor of item 1 to item 13, wherein the sensor provides an output signal capable of controlling at least one of a solar collector positioning device, an auxiliary light injector, a diverter baffle, an extractor baffle, or a combination thereof.

Item 15 is a light duct sensor, comprising: a hollow light duct section having a cross-sectional area; an optical fiber traversing the cross-sectional area to intercept light incident on a longitudinal surface of the optical fiber; a fluorescent material disposed in the optical fiber to convert a portion of the incident light; and a sensor disposed to accept an emitted light from at least one of a first end or a second end of the optical fiber, the sensor capable of detecting an intensity of the emitted light.

Item 16 is the light duct sensor of item 15, wherein the optical fiber comprises an inner core and an outer cladding, the inner core having a higher refractive index than the outer cladding.

Item 17 is the light duct sensor of item 15 or item 16, wherein the fluorescent material is capable of converting a first wavelength of light to a second wavelength of light, and the sensor is capable of detecting the second wavelength of light.

Item 18 is the light duct sensor of item 15 to item 17, wherein the optical fiber is disposed to traverse the cross-sectional area in a mesh pattern.

Item 19 is the light duct sensor of item 18, wherein the mesh pattern comprises a triangular mesh, a rectangular mesh, a pentagonal mesh, a hexagonal mesh or a random mesh.

Item 20 is the light duct sensor of item 15 to item 19, wherein a portion of the optical fiber is outside of the cross-sectional area.

Item 21 is the light duct sensor of item 20, wherein the portion of the optical fiber outside of the cross-sectional area comprises a coating to prevent light from entering or leaving the optical fiber.

Item 22 is the light duct sensor of item 15 to item 21, wherein the optical fiber is woven through the hollow light duct section.

Item 23 is the light duct sensor of item 15 to item 22, wherein one of the first end and the second end of the optical fiber comprise a reflector.

Item 24 is the light duct sensor of item 15 to item 23, wherein the hollow light duct section is capable of being inserted into a light duct system.

Item 25 is the light duct sensor of item 15 to item 24, wherein the sensor provides an output signal capable of controlling at least one of a solar collector positioning device, an auxiliary light injector, a diverter baffle, an extractor baffle, or a combination thereof.

Item 26 is a method for controlling a light distribution system, comprising: disposing a light duct sensor within a hollow light duct; monitoring an average light flux within the hollow light duct using the light duct sensor; detecting a change in the average light flux; and controlling at least one of a solar collector positioning device, an auxiliary light injector, a diverter baffle, an extractor baffle, or a combination thereof, to control the average light flux.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light duct sensor, comprising:
   a light detecting region comprising a cross-sectional area of a hollow light duct;
   an optical fiber disposed within the detecting region capable of intercepting light incident on a longitudinal surface of the optical fiber and guiding the intercepted light within the optical fiber; and
   a sensor disposed to accept an emitted light from at least one of a first end and a second end of the optical fiber, the sensor capable of detecting the emitted light intensity.

2. The light duct sensor of claim 1, wherein the optical fiber is disposed to traverse at least one of a width and a height of the hollow light duct.

3. The light duct sensor of claim 1, wherein the optical fiber is disposed to traverse a width and a height of the hollow light duct.

4. The light duct sensor of claim 1, wherein the optical fiber is disposed to traverse the cross-sectional area in a mesh pattern.

5. The light duct sensor of claim 4, wherein the mesh pattern comprises a triangular mesh, a rectangular mesh, a pentagonal mesh, a hexagonal mesh, or a random mesh.

6. The light duct sensor of claim 1, wherein the optical fiber comprises an inner core and an outer cladding, the inner core having a higher refractive index than the outer cladding.

7. The light duct sensor of claim 1, further comprising a fluorescent material dispersed in the optical fiber.

8. The light duct sensor of claim 7, wherein the fluorescent material is capable of converting a first wavelength of light to a second wavelength of light.

9. The light duct sensor of claim 1, further comprising a scattering material dispersed in the optical fiber.

10. The light duct sensor of claim 1, further comprising surface re-directing features on the optical fiber.

11. The light duct sensor of claim 1, wherein the emitted light intensity can be correlated to an average light flux within a hollow light duct.

12. A light duct sensor, comprising:
    a hollow light duct section having a cross-sectional area;
    an optical fiber traversing the cross-sectional area to intercept light incident on a longitudinal surface of the optical fiber;
    a fluorescent material disposed in the optical fiber to convert a portion of the incident light; and
    a sensor disposed to accept an emitted light from at least one of a first end or a second end of the optical fiber, the sensor capable of detecting an intensity of the emitted light.

13. The light duct sensor of claim 12, wherein the optical fiber comprises an inner core and an outer cladding, the inner core having a higher refractive index than the outer cladding.

14. The light duct sensor of claim 12, wherein the fluorescent material is capable of converting a first wavelength of light to a second wavelength of light, and the sensor is capable of detecting the second wavelength of light.

15. The light duct sensor of claim 12, wherein the optical fiber is disposed to traverse the cross-sectional area in a mesh pattern.

16. The light duct sensor of claim 15, wherein the mesh pattern comprises a triangular mesh, a rectangular mesh, a pentagonal mesh, a hexagonal mesh or a random mesh.

17. The light duct sensor of claim 12, wherein a portion of the optical fiber is outside of the cross-sectional area.

18. The light duct sensor of claim 12, wherein the optical fiber is woven through the hollow light duct section.

19. A method for controlling a light distribution system, comprising:
    disposing a light duct sensor within a hollow light duct;
    monitoring an average light flux within the hollow light duct using the light duct sensor;
    detecting a change in the average light flux; and
    controlling at least one of a solar collector positioning device, an auxiliary light injector, a diverter baffle, an extractor baffle, or a combination thereof, to control the average light flux.

20. The method of claim 19, wherein the light duct sensor comprises:

a light detecting region comprising a cross-sectional area of the hollow light duct;

an optical fiber disposed within the detecting region capable of intercepting light incident on a longitudinal surface of the optical fiber and guiding the intercepted light within the optical fiber; and a sensor disposed to accept an emitted light from at least one of a first end and a second end of the optical fiber, the sensor capable of detecting the emitted light intensity.

* * * * *

UNITED STATES PATENT AND TRADEMARK OFFICE
CERTIFICATE OF CORRECTION

PATENT NO.         : 9,765,950 B2
APPLICATION NO.    : 14/391115
DATED              : September 19, 2017
INVENTOR(S)        : Corrigan et al.

Page 1 of 1

It is certified that error appears in the above-identified patent and that said Letters Patent is hereby corrected as shown below:

In the Specification

<u>Column 2</u>
Line 62, delete "(Vicuiti™" and insert -- (Vikuiti™ --, therefor.

<u>Column 5</u>
Line 31, delete "elsewhere:" and insert -- elsewhere. --, therefor.

Signed and Sealed this
Fourteenth Day of August, 2018

Andrei Iancu
*Director of the United States Patent and Trademark Office*